US 8,335,510 B2

(12) United States Patent
Padfield et al.

(10) Patent No.: US 8,335,510 B2
(45) Date of Patent: Dec. 18, 2012

(54) CELLULAR COMMUNICATION SYSTEM AND A METHOD OF OPERATION THEREFOR

(75) Inventors: David Padfield, Marlborough (GB); Phillip C. Bloomfield, Calne (GB)

(73) Assignee: Motorola Mobility LLC, Libertyville, IL (US)

( * ) Notice: Subject to any disclaimer, the term of this patent is extended or adjusted under 35 U.S.C. 154(b) by 201 days.

(21) Appl. No.: 12/677,118

(22) PCT Filed: Sep. 11, 2008

(86) PCT No.: PCT/US2008/075924
§ 371 (c)(1),
(2), (4) Date: Mar. 9, 2010

(87) PCT Pub. No.: WO2009/048710
PCT Pub. Date: Apr. 16, 2009

(65) Prior Publication Data
US 2011/0014918 A1 Jan. 20, 2011

(30) Foreign Application Priority Data
Oct. 9, 2007 (GB) .................................. 0719704.9

(51) Int. Cl.
*H04W 36/04* (2009.01)
(52) U.S. Cl. ........................................ 455/442; 455/436

(58) Field of Classification Search .................. 455/436, 455/442; 370/431, 338
See application file for complete search history.

(56) References Cited

U.S. PATENT DOCUMENTS

| | | | |
|---|---|---|---|
| 6,466,556 B1 | 10/2002 | Boudreaux | |
| 7,321,577 B2 * | 1/2008 | Shimizu et al. | 370/338 |
| 2005/0152389 A1 * | 7/2005 | Sakata | 370/431 |
| 2006/0187882 A1 * | 8/2006 | Kwak et al. | 370/331 |
| 2007/0155388 A1 | 7/2007 | Petrovic et al. | |

FOREIGN PATENT DOCUMENTS

| | | | |
|---|---|---|---|
| EP | 2053796 | * | 4/2009 |
| EP | 002053796 | * | 4/2009 |
| WO | 2007139641 A2 | | 12/2007 |

* cited by examiner

*Primary Examiner* — Patrick Edouard
*Assistant Examiner* — Myron K Wyche (57) ABSTRACT

A cellular communication system is supported by first physical layer processes, second layer user plane control processes and third layer control plane control processes. The first layer process is executed in a base station (101). A distribution controller (113) allocates the layer processes such that the second layer process is executed in a different network element than the third layer process. The second and/or third layer process may furthermore be allocated to a different network element than the base station (101) executing the first layer process. The second and/or third layer process may be allocated to base stations (103, 105). This allows improved load balancing and/or may reduce RNC relocations in a system having base station RNC functionality.

9 Claims, 5 Drawing Sheets

CELLULAR COMMUNICATION SYSTEM AND A METHOD OF OPERATION THEREFOR

FIELD OF THE INVENTION

The invention relates to a cellular communication system and a method of operation therefor and in particular, but not exclusively to a Universal Mobile Telecommunication System (UMTS).

BACKGROUND OF THE INVENTION

In a conventional cellular communication system, the arrangement of network elements is hierarchical and standardised. For example, for a conventional UTRAN (UMTS (Universal Mobile Telecommunications System) Terrestrial Radio Access Network), a hierarchical arrangement of Mobile Switching Centres (MSCs), Radio Network Controllers (RNCs) and base stations (Node Bs) is implemented to support the mobile segment.

In such systems, there is an inherent and/or practical limitation on the number of elements at one level of the hierarchy and the number of elements at the next level. For example one MSC-U (Mobile Switching Centre for UMTS) can typically connect up to ten or twenty RNCs and one RNC can typically manage tens (or hundreds) of Node Bs (UMTS base stations).

In such a conventional arrangement, mobile user equipments make handovers from cell to cell as they move within a UMTS network and occasionally such a handover is across the boundary between two sets of cells controlled by different RNCs. In this case, user equipments that currently have a dedicated connection to the network (i.e. they are in a voice or data call) will be involved in a relocation procedure that moves the management of the call from the current (source) RNC to a new (target) RNC. This procedure, known as SRNS (Serving Radio Network Subsystem) relocation, is complex and can lead to an interruption in service for either a data or a voice call. In the case of a voice call this can be particularly noticeable to the participants in the call and can cause a disruption or delay in the perceived speech. Also, a significantly greater amount of RNC and MSC-U signalling messaging is required to achieve an SRNS relocation than for a handover between cells controlled by the same parent RNC.

A method which has been used to increase the capacity of cellular communication systems is the concept of hierarchical cells wherein a macrocell layer is underlayed by a layer of typically smaller cells having coverage areas within the coverage area of the macrocell. Such microcells, picocells and femtocells have much smaller coverage thereby allowing a much closer reuse of resources.

Currently there is a trend towards introducing a large number of small picocells to UMTS systems. For example, it is envisaged that picocell base stations known as residential access points may be deployed typically having only a target coverage area of a single residential dwelling or house. As another example, it has been proposed to cover e.g. office buildings in a number of small picocells with a range of a few tens of meters.

Furthermore, it has been proposed that individual residential or enterprise access points include at least some RNC functionality such that the individual access point is coupled to the network as an RNC entity with an individual RNC identity. Such an approach may provide the advantage that RNC devices supporting a very large number of subordinate base station/Node B access points will not be required. Also the standard interface between a Node B and RNC is delay sensitive and would not lend itself to some of the potential deployment environments for a home Node B access point, for example an ADSL (Asymmetric Digital Subscriber Line) connection between the access point and RNC.

Thus, in such networks, a large number of RNC entities will be present in the network (e.g. in some architectures there may be one RNC for each access point). However, such an approach is also associated with some disadvantages.

For example, mobile user equipments supported by such a network of access points will experience an SRNS relocation at every handover between access points. Thus, the SRNS relocation is no longer a rare situation as in a conventional UMTS network but occurs very frequently. As a consequence, a large additional signalling overhead is introduced and the quality of the provided communication service is reduced. Thus, whereas a collapsed architecture with RNC functionality in each access point may result in reduced infrastructure cost (by removing the need for a dedicated RNC), it results in potential issues of degraded quality (in particular for voice handovers) and increased resource required for a significantly increased signalling overhead (due to the higher number of relocations performed).

Furthermore, the processing resource required in each access point can be significantly increased resulting in increased cost and complexity of the access point. The processing resource available at the access point must be dimensioned such that it is sufficient to provide both the base station functionality and RNC functionality for the worst case which typically results in a large resource overhead.

Hence, an improved system would be advantageous and in particular a system allowing increased flexibility, improved resource usage, reduced signalling, improved communication quality, reduced cost and/or complexity of elements and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a cellular communication system for supporting at least a communication of a user equipment, the communication being supported by at least: a first layer process comprising physical layer processes, a second layer process comprising user plane control processes, and a third layer process comprising control plane control processes; and the communication system comprising: a first base station for communicating with the user equipment over an air interface and comprising means for executing the first layer process; and allocating means for allocating the second layer process to a different network element than the third layer process.

The invention may provide improved performance in a cellular communication system. In particular, the invention may allow a distribution of functionality which can reduce signalling, cost, complexity and/or resource usage in many embodiments.

The invention may in particular provide improved performance for a cellular communication system wherein a plurality of base stations, such as access points and/or picocell base stations, have a dedicated RNC address. Thus, the invention may provide particularly advantageous performance in a system having a collapsed architecture wherein an RNC entity exists for each base station of a group of base stations. The invention may e.g. in such a case reduce the number of RNC relocations thereby reducing signalling overhead and/or disruptions to the communication. Alternatively or additionally, the invention may in such embodiments reduce the processing resource required by individual network elements and/or may improve computational load balancing in the system.

The second layer process may specifically comprise RNC processes for processing and/or communicating user plane data (packets). The third layer process may specifically comprise RNC processes for processing and/or communicating control plane data (packets). The second layer process may specifically comprise user plane processes of network layers higher than the physical layer. The third layer process may specifically comprise control plane processes of network layers higher than the physical layer.

The first layer process is specifically capable of receiving/transmitting data to the second and third layer processes in order to support the communication with the user equipment over the air interface. The cellular communication system may comprise a core network which communicates with the first and second layer processes to support the communication.

The cellular communication system may comprise a plurality of network elements capable of supporting second layer processes and third layer processes for a plurality of user equipments and the allocation means may be arranged to allocate the second layer process and third layer process to different network elements of the plurality of network elements. The plurality of network elements may specifically be base stations/access points of the cellular communication system.

According to another aspect of the invention there is provided a method of operation for a cellular communication system supporting at least a communication of a user equipment, the communication being supported by at least: a first layer process comprising physical layer processes, a second layer process comprising user plane control processes, and a third layer process comprising control plane control processes; and the method comprising: a first base station communicating with the first user equipment over the air interface by executing the first layer process; and allocating the second layer process to a different network element than the third layer process.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a UMTS cellular communication system. However, it will be appreciated that the invention is not limited to this application but may be applied to many other cellular communication systems.

Figure 1:
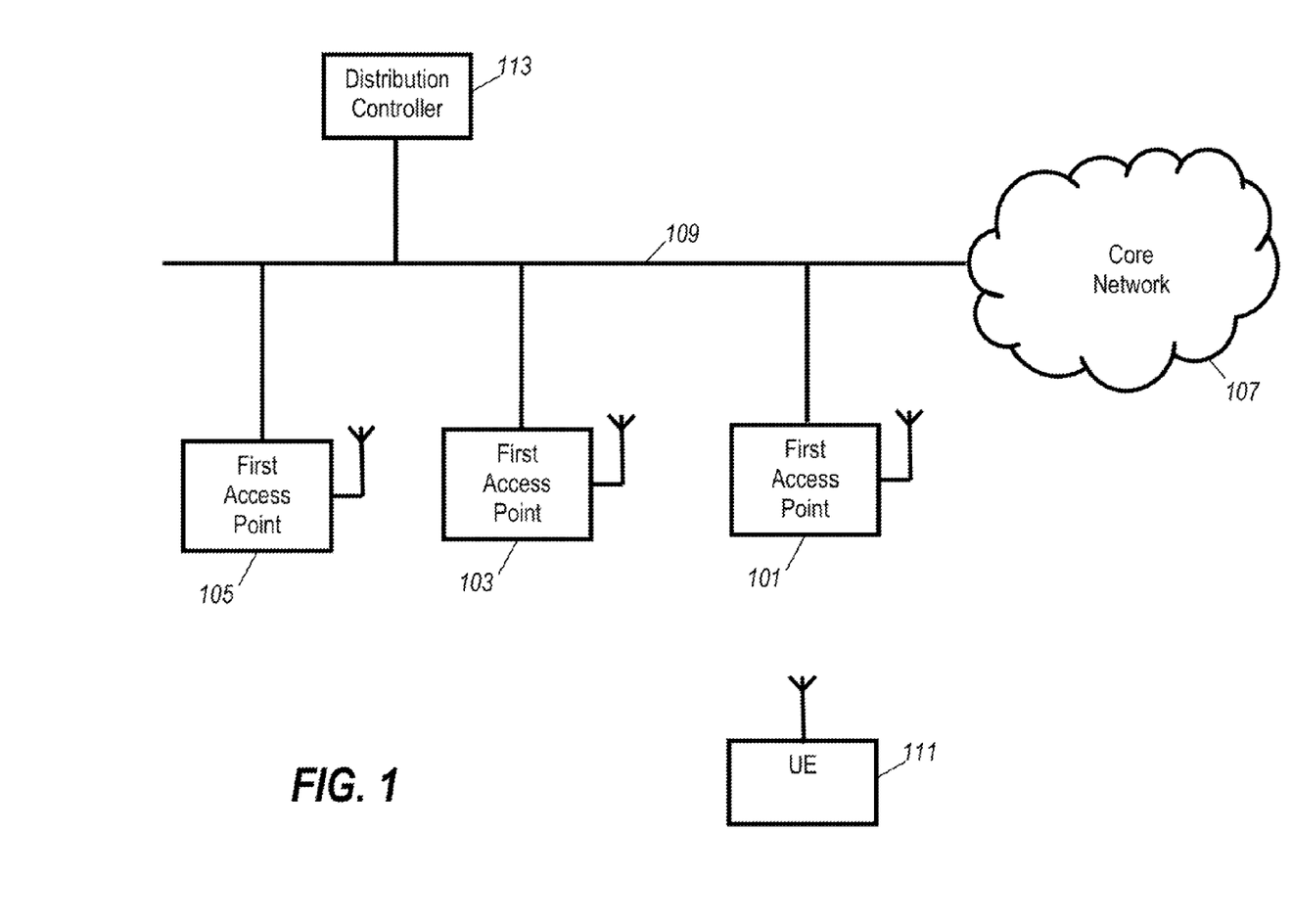
FIG. 1 illustrates an example of a cellular communication system in accordance with some embodiments of the invention.

FIG. 1 illustrates an example of a UMTS cellular communication system in accordance with some embodiments of the invention.

The UMTS cellular communication system comprises a number of base stations which support user equipments over the air interface of the UMTS communication system. FIG. 1 illustrates three base stations 101, 103, 105 which coupled to a core network 107 via a local network 109. In the example the base stations 101-105 are collapsed architecture pico-cell base stations that comprise both RNC and base station (Node B) functionality. Specifically, the base stations 101-105 are access points intended to provide access to the cellular communication system within a very small area, such as within a confined residential environment or an office environment. The base stations 101-105 will henceforth be referred to as access points 101-105 and represent a potentially very large number of access points providing an underlay layer of small cells targeting specific areas.

In contrast to a typical UMTS architecture, the access points 101-105 are thus not coupled to the core network 107 via a separate RNC entity supporting a large number of base stations/access points. Rather, in order to avoid the significant costs associated with such RNC entities, the RNC functionality required for supporting air interface communications of the access points 101-105 is implemented in the access points 101-105 themselves. Since each access point 101-105 is likely to only support a very low number of simultaneous communications with user equipments, this may allow a reduced complexity and cost as the RNC functionality can be dimensioned for this reduced capacity.

Accordingly, the connection between the access points 101-105 and the core network 107 corresponds to a connection between the core network 107 and an RNC entity rather than a base station entity. In particular, the local network 109 can implement the Iu interface of the UMTS cellular communication system.

In the example a user equipment 111 is initially within the coverage area of the first access point 101 and is supported by this. It will be appreciated that although the operation of the system for brevity and clarity will be described with reference to only one user equipment 111, each of the access points 101-105 may be capable of simultaneously supporting a plurality of user equipments.

In the system of FIG. 1, each access point 101-105 does not individually and separately implement the base station and RNC functionality used to support user equipments served by the individual access point 101-105. Rather, a flexible and advantageous distribution of the base station and RNC functionality between the group of access points 101-105 is implemented. This distribution of functionality is in the example controlled by a distribution controller 113 coupled to the local network 109. It will be appreciated that although the example will be described with reference to a single, separate distribution controller 113 connected to the access points 101-105 via the local network 109, the functionality for allocating processes and distributing operation over different access points 101-105 may be distributed over multiple network elements including the access points 101-105 themselves. As an example, the access points 101-105 may themselves comprise functionality for negotiating with other access points 101-105 in order to distribute or reallocate specific processes. Thus, a peer-to-peer computational system may be implemented in some embodiments.

In order to support an active communication from the user equipment 111, the access points 101-105 must execute various processes. In the system of FIG. 1, these processes are divided into three main processes:

- A first layer process which comprises a number of physical layer processes. The physical layer is the lowest layer of the UMTS stack supporting the communication over the air interface (corresponding to the lowest layer of the Open Systems Interface (OSI) model). The first layer process can thus include processes such as channel (error correcting) coding, interleaving, modulation etc. Specifically, the first layer process can include the processes required to reliably transmit individual bits over the radio air interface.
- A second layer process which comprises a number of user plane control processes. The second layer processes can specifically comprise the UMTS RNC processes that are associated with communication of user plane data to and from the user equipment 111. The second layer process can thus comprise the processes that are part of an RNC according to the UMTS Technical Specifications and are used for communicating user data between the core network 107 and the user equipment 111. The user plane processes of the second layer process can specifically correspond to processes of the PDCP, RLC and MAC layer(s) of the UMTS stack corresponding to the second and third layer of the OSI model.
- As a specific example, the second layer process can comprise a Packet Data Convergence Protocol (PDCP) layer process. PDCP is one of the layers of the Radio Traffic Stack in UMTS and performs Internet Protocol (IP) header compression and decompression, transfer of user data and maintenance of sequence numbers for Radio Bearers which are configured for lossless SRNS relocation.
- As another example, the second layer process can comprise a Radio Link Control, RLC, layer process. The RLC protocol contains a suite of features and options for managing the radio link over the air interface.
- As another example, the second layer process can comprise a Medium Access Control (MAC) layer process. The MAC layer is part of the data link layer specified in the seven-layer OSI model (layer 2) and provides addressing and channel access control mechanisms for the air interface communications.
- The RLC protocol layer along with the MAC protocol forms the data link layer of the UMTS radio network at the Uu interface that operates on the RNC and the user equipment.
- A third layer process which comprises a number of control plane processes. The third layer process can specifically comprise the UMTS RNC processes that are associated with communication of control plane data to and from the user equipment 111. The third layer process can thus comprise the processes that are part of an RNC according to the UMTS Technical Specifications and are used for common signalling and dedicated signalling for an active communication. The control plane processes of the third layer process can specifically correspond to processes of the RRC layer(s) of the UMTS stack corresponding to the second layer of the OSI model.
- As a specific example, the third layer process can comprise a Radio Resource Control (RRC) process. The RRC layer belongs to the UMTS protocol stack and handles the control plane signalling of Layer 3 between the user equipments and the RNC and perform functions for connection establishment and release, broadcast of system information, Radio Bearer establishment/reconfiguration and releases, RRC connection mobility procedures, paging notification and release, outer loop power control etc.
- As another example, the third layer process can comprise a Network Access Stratum, NAS, process. The NAS process includes the signalling procedures and protocols between the core network and user equipment used for: establishing and releasing circuit switched calls, establishing and releasing packet switch calls, sending and receiving messages typically known as the SMS (short message service), broadcast of system information, support of services based upon user equipment location and control of the lower layers.

As a specific example, for a UMTS and Long Term Evolution (LTE) communication system, the first layer process implements the UMTS physical layer and MAC-hs, the second layer process implements the UMTS RLC, MAC and PDCP protocols and the third layer process implements the UMTS RRC and/or NAS protocol.

As another specific example, for a GSM (Global System for Mobile communication) and/or GPRS (General Packet Radio Service) system, the first layer process implements the physical layer, the second layer process implements the LAPDm (Link Access Procedure on the Dm channel, RLC and MAC protocols and the third layer process implements the RR (Radio Resource), GRR (CPRS Radio Resource) and NAS protocols.

In the described example, the third layer process is specifically be a process that includes the procedures, protocol or protocols used for establishing and releasing connections and data paths between the user equipment and access point, broadcasting network system information to user equipments, managing mobility between cells, paging user equipments and power control of the user equipment. The second layer process is in the example be a process that includes (but is not limited to) the MAC and LLC sub-layers of the OSI model whereas the first layer process corresponds to the physical layer of the OSI model.

In the system, the first, second and third layer processes for the communication to the user equipment 111 can be allocated to different access points 101-105 by the distribution controller 113. Specifically, the first layer process is very closely linked to the radio communication over the air interface and is performed by the serving access point(s) 101. However, the second and third layer processes for the communication with the user equipment 111 can be allocated to and executed by other network elements including other access points 103, 105 than the serving base station 101.

For example, in the situation where the user equipment 111 is supported by the first access point 101, the second layer process may be performed by the second access point 103 and the third layer process may be performed by the third access point 105. Thus, the first layer process of the first access point 101 can communicate with the second layer process executed in the second access point 103. The second layer process can then communicate with the third layer process in the third access point 105. In the example, the second layer process communicates directly with the core network 107 for user plane data and the third layer process communicates directly with the core network 107 for control plane data.

Thus, rather than implementing the RNC for the access points 101-105 as either a single large standalone node in the network (as in typical conventional UMTS systems) or as multiple separate dedicated entities each co-located with a base station/access point, the approach of the described system implements the RNC as a distributed entity across a plurality of access points 101-105. Thus, in contrast to other collapsed architecture processes, the current system does not employ, require or assume a co-location of all processes of the RNC and the base stations. Rather, a dynamic and flexible distribution of the RNC functionality can be achieved by dynamically and flexible allocating the second and/or the third layer process to other access points 103, 105 than the serving access point 101.

It will be appreciated that although the described example focuses on a system where the second and third layer processes are executed in access points/base stations, the processes may be performed in other network elements in other embodiments. For example, in some systems, pure computational network elements may be introduced for the single purpose of providing computational resource for executing second or third layer processes. Such computational network elements may be connected to the local network 109 and can comprise only functionality for performing the processes of the second and/or third layer. This may provide a simple and low cost option for increasing the computational resource of the system thereby allowing the individual access points to be designed with lower computational capacity.

In the specific example, each of the access point 101-105 comprises functionality for executing both first layer processes, second layer processes and third layer processes.

Figure 2:
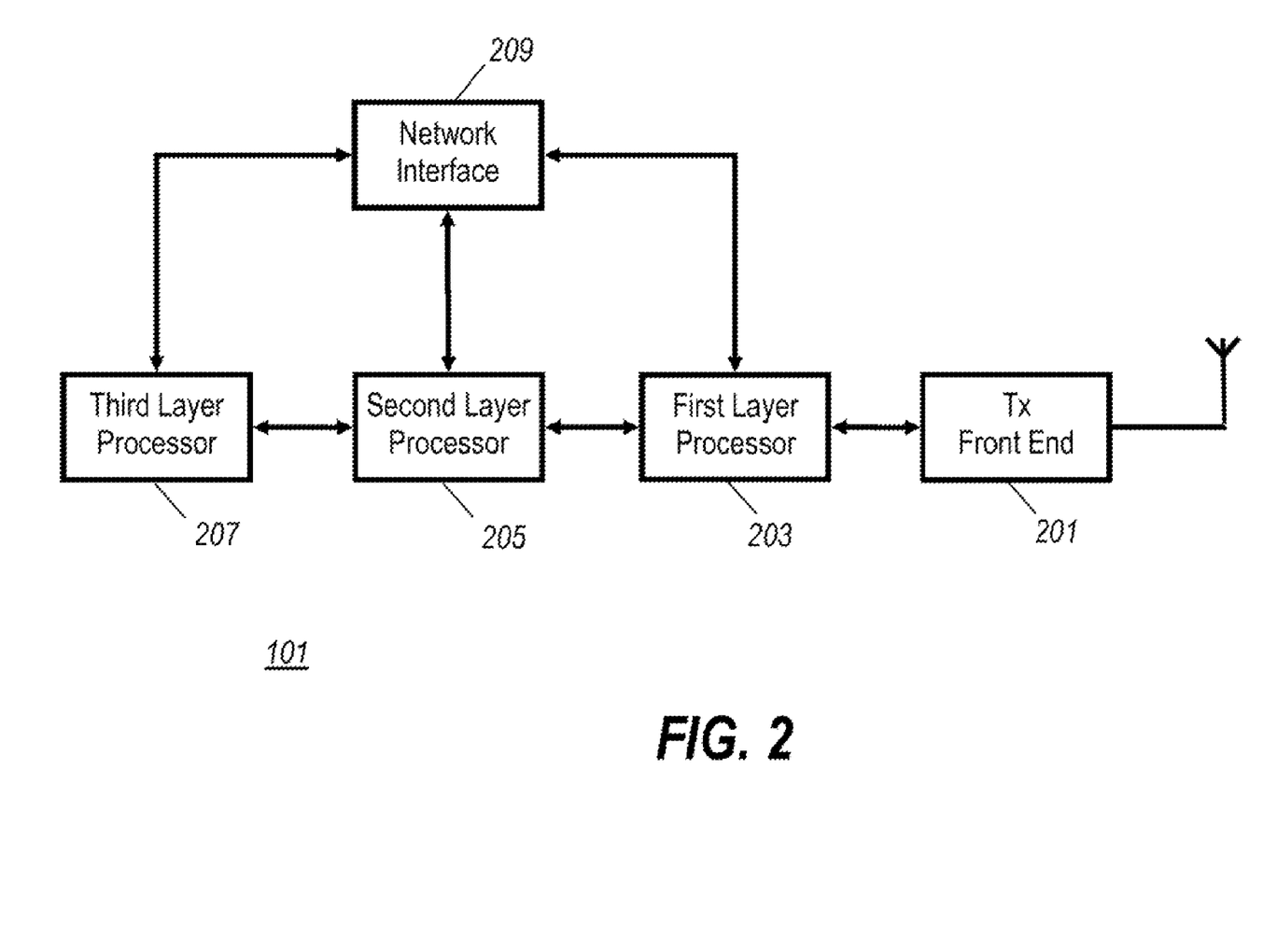
FIG. 2 illustrates an example of a base station in accordance with some embodiments of the invention.

FIG. 2 illustrates elements of the first access point 101 in more detail. In the specific example, the second and third access point 103, 105 is identical to the first access point 101 and thus FIG. 2 also represents these access points.

The access points comprise a transceiver front-end 201 which is arranged to receive and transmit radio signals over the air interface. The transceiver front-end 201 is coupled to a first layer processor 203 which is capable of executing first layer processes. In the example where the user equipment 111 is served by the first access point 101, the first layer processor 203 executes the first layer process for the air interface communication with the user equipment 111.

The first layer processor 203 is coupled to a second layer processor 205 which is capable of executing second layer processes. The second layer processor 205 is specifically not only capable of executing second layer processes for air interface communications of the first access point 101 but also of other access points 103, 105.

The second layer processor 205 is coupled to a third layer processor 207 which is capable of executing third layer processes. The third layer processor 207 is specifically not only capable of executing third layer processes for air interface communications of the first access point 101 but also of other access points 103, 105.

It will be appreciated that although FIG. 2 illustrates separate processors for the different layer processes, these may be implemented in a single processor such as a microprocessor, microcontroller or signal processor.

The first layer processor 203, the second layer processor 205 and the third layer processor 207 are coupled to a network interface 209 which interfaces the access points 101-105 to the local network 109. The network interface 209 allows the third layer processor 207 and the second layer processor 205 to communicate with the core network 107. Specifically, an MSC (or soft switch and Media Gateway (MGW)) combination of the core network 107 may communicate with a third layer processor 207 for control plane traffic and with a second layer processor 205 for user plane traffic. Hence, a third layer process executed by a third layer processor 207 of one of the access points 101-105 together with a second layer processor executed by a second layer processor 205 of one of the access point 101-105 can together provide the required RNC functionality for the corresponding communication. Thus, the processes performed by the access points 101-105 implement the required RNC functionality and is from the core network indistinguishable from a conventional single entity RNC (except that the core network 107 may communicate with different addresses for user plane traffic and control plane traffic).

In addition, the network interface 209 allows the layer processors 203, 205, 207 of different access points 101-105 to communicate with each other. Specifically, a first layer processor 203 of the first access point 101 can communicate with the second layer processor 205 of the second access point 103 which again can communicate with the third layer processor 207 of the third access point 105 corresponding to an example where the first layer process is performed by the first access point 101, the second layer process is performed by the second access point 103 and the third layer process is performed by the third access point 105.

Thus, the system allows for distribution of different layer processes between the different access points 101-105. In the example, the distribution controller 113 communicates with the access points 101-105 to allocate processes to the individual access points 101-105. This allocation may be performed at call setup and may be dynamically updated.

Figure 3:
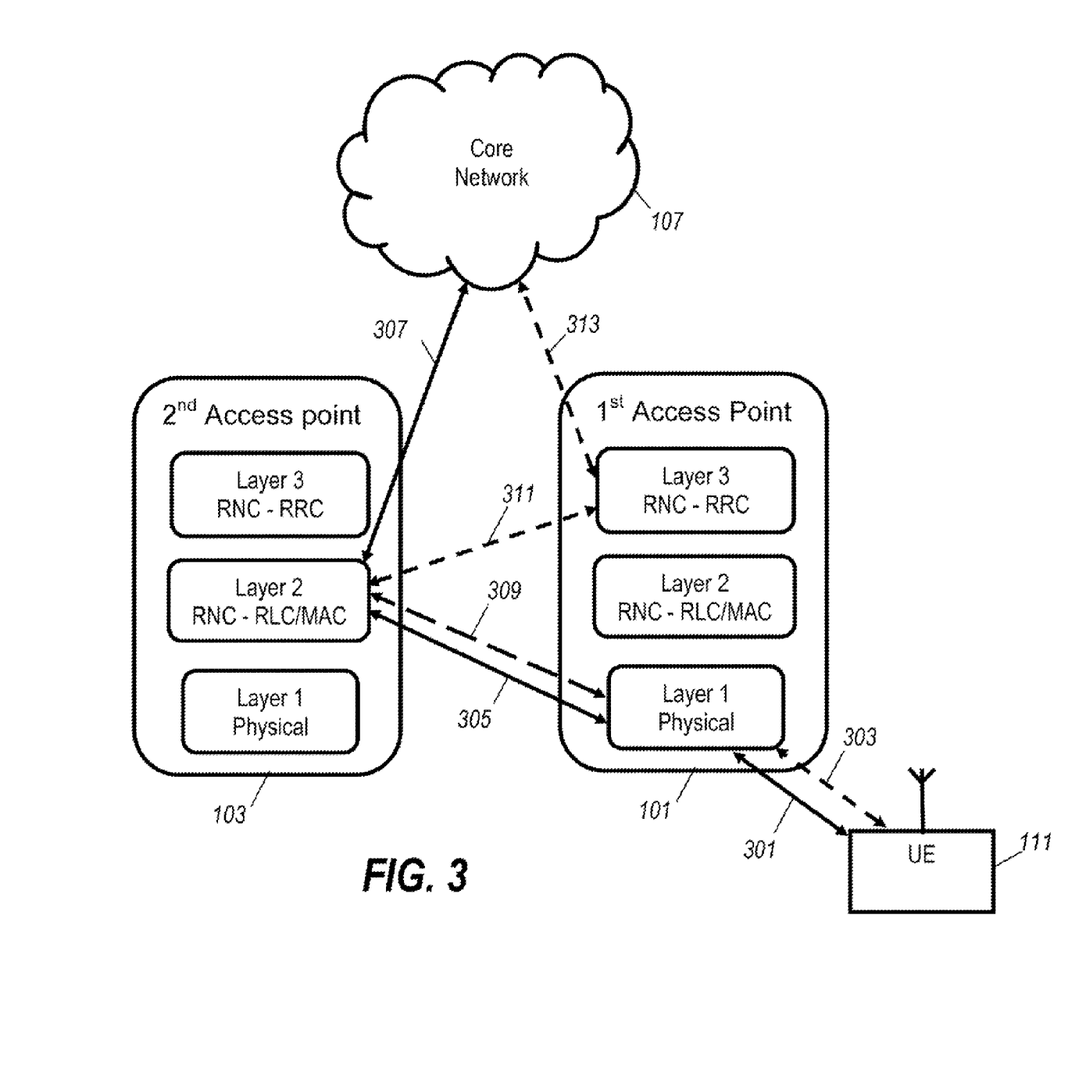
FIG. 3 illustrates an example of process distribution in a cellular communication system in accordance with some embodiments of the invention.

FIG. 3 shows an example of a distribution of different processes across different access points 101, 103. In the example, the user equipment 111 is served by the first access point 101 and accordingly the first layer process is allocated to the first access point 101. However, in the example the second layer process is not allocated to the first access point 101 but is allocated to the second access point 103 whereas the third layer process is also allocated to the first access point 101.

Thus, in the example, user plane data 301 and control plane data 303 is communicated between the user equipment 111 and the first access point 101 wherein the first layer processor 203 executes the first layer process.

Also, a communication link is set up between the first access point 101 and the second access point 103 allowing data to be exchanged between the first layer processor 203 of the first access point 101 and the second layer processor 205 of the second access point 103. This communication link exchanges user plane data 305 allowing the second layer processor 205 of the second access point 103 to perform the second layer process for the communication.

The second layer processor 205 of the second access point 103 furthermore establishes a connection with the core network 107 allowing user data traffic 307 to be communicated directly between the second access point 103 and the core network 107. Thus, user data communication between the user equipment 111 and the core network 107 is supported by a first layer process in the first access point 101 and a second layer process in the second access point 103.

For control plane traffic, the first layer process exchanges data with the third layer process executed by the third layer processor 207 of the first access point 101. However, the control plane traffic is exchanged by the second layer process and accordingly control plane traffic 309 is exchanged between the first layer processor 203 of the first access point 101 the second layer processor 205 of the second access point 103. This control plane traffic 311 is then exchanged between the second layer processor 205 of the second access point 103 and the third layer processor 207 of the first access point 101. The third layer process then establishes a connection with the core network 107 and uses this to support the control plane traffic 313.

An advantage of the described system is that significantly improved a handover performance can be achieved in many scenarios. Specifically, in many embodiments using a collapsed architecture, a handover between access points can be achieved without requiring any SRNS relocation.

Figure 4:
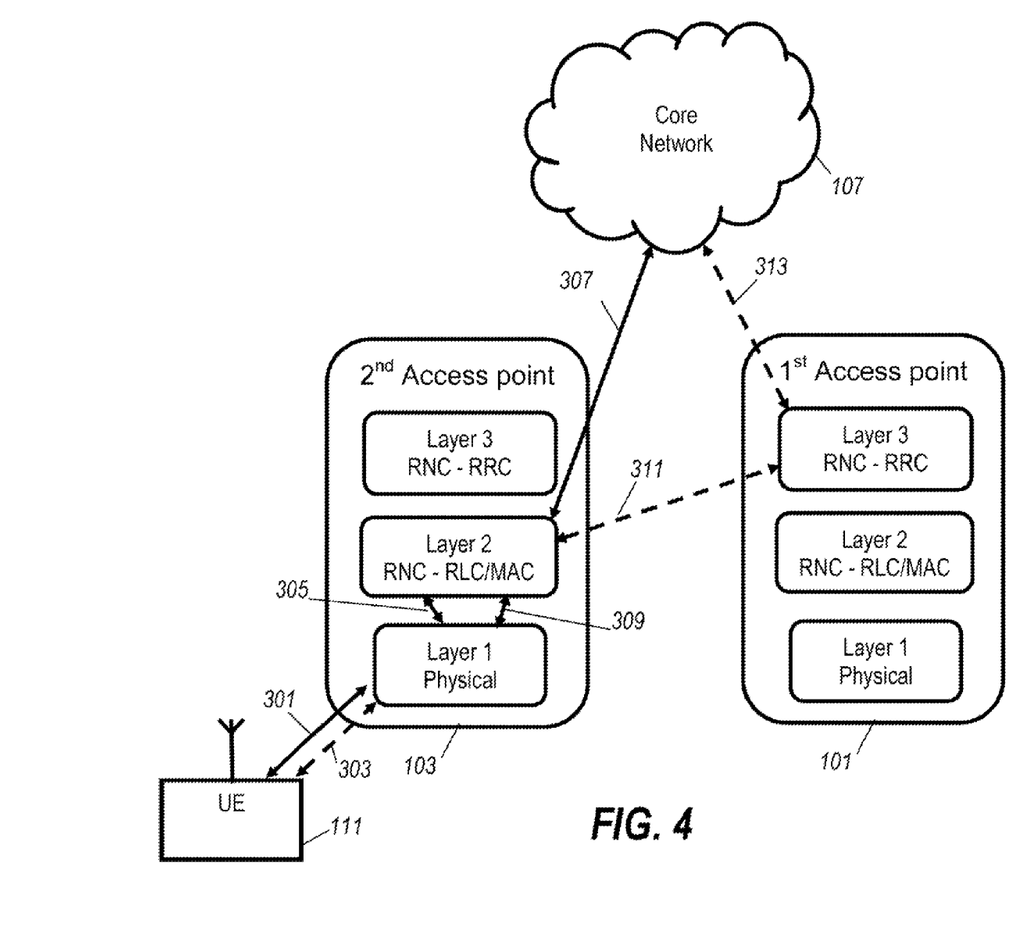
FIG. 4 illustrates an example of process distribution in a cellular communication system in accordance with some embodiments of the invention.

For example, the user equipment 111 can hand over from the first access point 101 to the second access point 103 without resulting in any change in the communication connection to the core network 107. FIG. 4 illustrates the scenario of FIG. 3 following a handover of the user equipment 111 from the first access point 101 to the second access point 103.

Following the handover, the first layer process has been reallocated from the first access point 101 to the second access point 103 such that the physical layer processes are still performed by the serving base station 103. Thus, the first layer process is now performed by the first layer processor 203 of the second access point 103 rather than of the first access point 101. However, the second layer process and the third layer process have not been reallocated and thus the second layer process is still performed by the second layer processor 205 of the second access point 103 and the third layer process is still performed by the third layer processor 207 of the first access point 101. Thus, the only communications that have changed are the links from the user equipment 111 to the access point 103 and from the first layer process to the second layer process. However, the properties and characteristics of the connection with the core network 107 are unchanged and specifically the handover has been achieved without requiring any SRNS relocation or indeed without requiring any modifications in the core network 107.

Thus, the described system allows the first layer process to be reallocated between access points 101, 103 without relocating the second layer process and the third layer process. Thus, a handover of a user equipment 111 can be effectively supported by relocating the first layer process but without requiring any SRNS relocation. Thus, the MSC of the core network 107 can maintain a constant signalling connection to the distributed RNC entity formed by the second and third layer processes. Indeed the only change needed to support the handover is that the communication links between the second layer process and the first layer process are updated to reflect that the first layer process has moved. In the specific example, this is simply done by establishing new communication links between the first layer processor 203 and the second layer processor 205 of the second access point 103.

It will be appreciated that the different layer processes can be flexibly and independently relocated between different access points. For example, the second layer process may be reallocated to a different access point without any handover of the user equipment or reallocation of the first layer process or the third layer process. Similarly, the third layer process may be reallocated to another access point without the second layer process or the first layer process being reallocated. As another example, following a handover the second layer process and/or the third layer process may be reallocated e.g. to the access point to which the first layer process is reallocated.

As yet another example, in some embodiments, the distribution controller 113 may seek to allocate the first and second layer processes to the same access point. Thus, following a handover which reallocates the first layer process from a source access point (the access point 101 serving the user equipment 111 prior to the handover) to a destination access point (the access point 103 serving the user equipment 111 after the handover), the distribution controller 113 may seek to reallocate the second layer process to the destination access point without reallocating the third layer process. This may in many embodiments reduce the communication requirement for the local network 109 while reducing the signalling changes required in the interfacing to the core network 107.

In some embodiments, the distribution controller 113 may be arranged to allocate at least one of the second layer process and the third layer process to a network element of a plurality of network elements in response to a computational loading of each of the plurality of network elements.

For example, each of the access points 101-105 may periodically transmit a computational load indication to the distribution controller 113 (or the distribution controller may poll the access points 101-105 when performing an allocation) which may use this to allocate new layer processes to individual access points 101-105 or to reallocate processes between these. For example, if an access point indicates that it currently has a large amount of unused computational resource, the distribution controller 113 may reallocate a second layer process to this access point from an access point which currently experiences a high computational load. Thus, the system may allow improved load balancing thereby allowing the individual access points to have a lower computational resource (as they need not have sufficient resource for local worst case conditions).

In a typical system, the second layer process is computationally demanding whereas the first and third layer processes may be less demanding. Accordingly, the distribution processor 113 may seek to allocate the third layer process to the same access point as the first layer process (i.e. the serving access point) whereas the second access point is allocated to provide a more even distribution of the computational load.

In many embodiments, the allocation of the layer processes to different access points is performed at call setup. In some embodiments, the initial allocation may then be maintained throughout the duration of the call thereby eliminating the need for any SRNS relocations or modifications in the core network 107.

As an example, at call setup the distribution controller 113 may seek to allocate the third layer process and the first layer process to the access point initially serving the user equipment 111. In some embodiments, the distribution controller 113 may also seek to allocate the second layer process to the initial serving base station (e.g. provided that this has sufficient available resource) in order to reduce the communication on the local network 109 between different layer processes.

However, as another example, an approach which can be used when selecting the location of the second layer process when setting up a new call is to choose an access point such that the computational load of the second layer processing across the network of access points is most evenly distributed. This approach can allow an improved provisioning of resources in each access point as the individual worst case does not need to be catered for in the hardware and software of each access point. Rather, only the average network distributed worst case demand must be met which may be considerably lower than the individual peak.

In some cases, the second and/or the third layer process for a given communication may be distributed over a plurality of access points 101-105. For example, the user plane control processes of the second layer control process may be distributed over a plurality of network elements such that e.g. the MAC layer is implemented in one access point whereas the RLC layer is implemented in a different access point. As another example, some control plane control processes may be distributed over different access points such that e.g. some RRC procedures are implemented in one access point whereas other RRC procedures are implemented in another access point.

As another example, the second and/or third layer process may be vertically fragmented over a plurality of access points

101-105 such that e.g. for example Signalling Radio Bearers (SRBs) and Radio Access Bearers (RABs) might be handled in separate access points 101-105 although they relate to communication with the same user equipment 111.

This may provide a further improved computational load balancing at the expense of increased communication between the access points.

In a scenario wherein a user equipment 111 is in a soft handover, it may simultaneously be supported by two or more access points. Thus, a first layer process may simultaneously be performed by two different base stations. In such a case, the multiple physical layer processes may communicate with a single second layer process which may be implemented in one of the soft handover access points or in a different access point. Thus, the second layer process may simultaneously support physical layer processes in different access points supporting a soft handover of the user equipment.

It will be appreciated that in the described embodiment, the core network 107 has separate end-points for the user plane communication (namely the address of the second layer process) and for the control plane communication (namely the address of the third layer process). Thus, the core network uses different addresses depending on the nature of the data being communicated and in the situation where the second and third layer processes are allocated to different base stations, these addresses correspond to different network elements.

However, in other examples, the core network 107 use only one address and have only a single end-point for all communication. For example, all communication from the core network 107 may be addressed to the third layer process and this may then identify all user plane communication and forward this directly to the second layer process in another access point. This may allow a facilitated core network operation that does not require differentiation by the core network and may in particular allow the core network to operate as if a single non-distributed RNC network entity was supporting the access points. Furthermore, the approach may allow relocation of the second layer process without requiring any SRNS relocation or modification in the network thereby facilitating dynamic computational load balancing between the access points. However, the approach may increase the communication resource usage for the local network.

It will be appreciated that any suitable means for communicating between the different layers may be used including e.g. a dedicated non standardised approach. However, in the described example, the communication between the serving access point implementing the first layer process and a different base station implementing the second layer process is in accordance with either a UMTS Iur interface or a UMTS Iub interface.

Thus, as one example, the communication may follow the UMTS Iur specification for the interface between two RNCs (corresponding to a serving RNC and a "drift" RNC). In this example, the second layer process communicates with a drift RNC process in the serving access point. The drift RNC process may specifically comprise only functionality for supporting the communication with the second layer process in the other access point.

In the other example, the UMTS Iub specification for the interface between an RNC and a Node B/base station/access point is used. In this example, the second layer process directly communicates with the first layer process in the serving access point in order to exchange user data/voice frames and broadcast and dedicated control signalling.

It will be appreciated that the described system can provide many advantages including the reduced or eliminated requirement for SRNS relocation and the reduction in the associated signalling and disruptions. Thus, an improved call quality and resource usage can be achieved. Furthermore an improved load balancing can be achieved allowing reduced hardware processing requirements for each individual access point.

Figure 5:
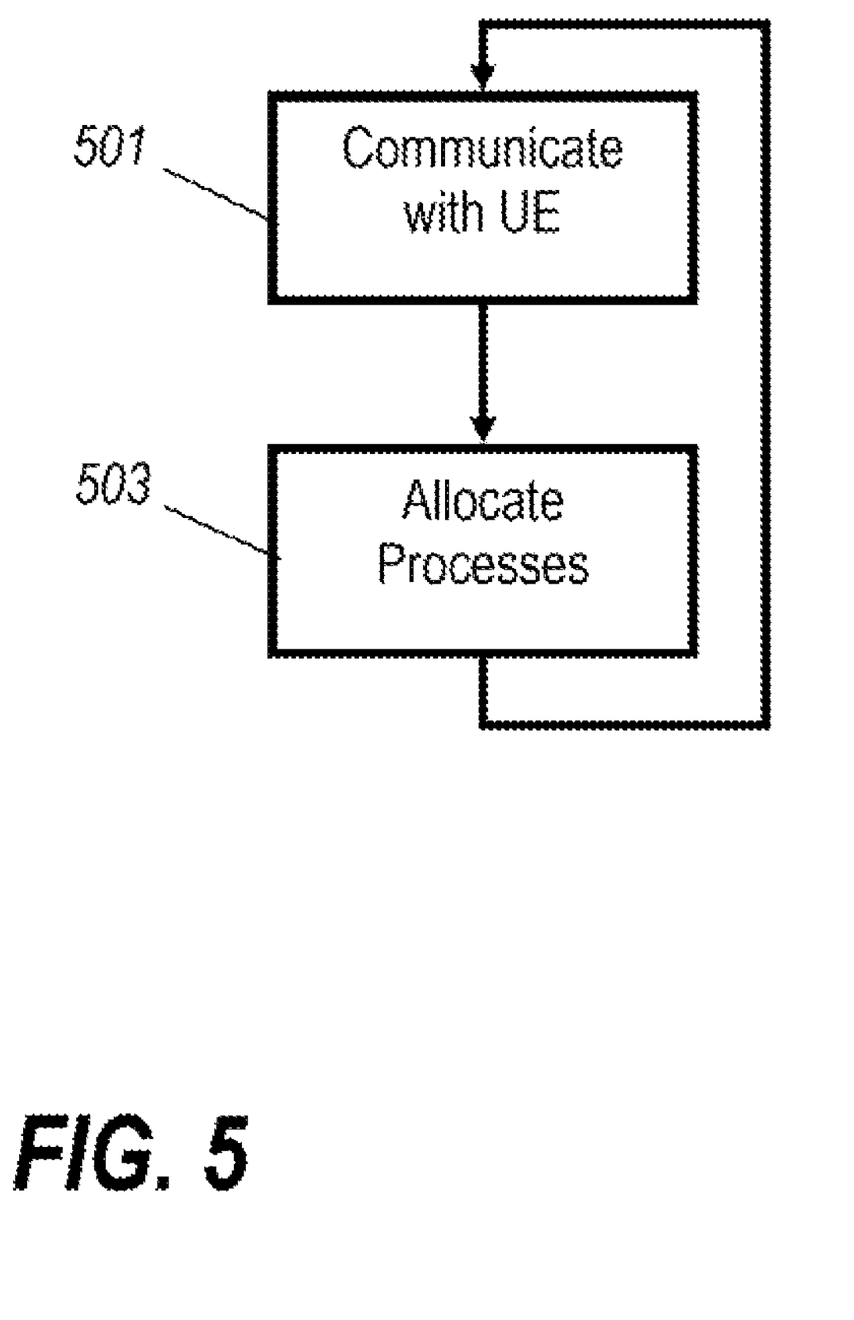
FIG. 5 illustrates a method of operation for a cellular communication system in accordance with some embodiments of the invention.

FIG. 5 illustrates a method of operation for a cellular communication system in accordance with some embodiments of the invention. The system supports at least one communication of a user equipment by at least: a first layer process comprising physical layer processes, a second layer process comprising user plane control processes and a third layer process comprising control plane control process.

The method initiates in step 501 wherein a first base station communicates with the user equipment over the air interface using the first layer process.

Step 501 is followed by step 503 wherein the second layer process is allocated to a different network element than the third layer process. The second and/or third layer process may also be allocated to a different network element than the first layer process.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system for supporting at least a communication of a user equipment, the communication being supported by at least a first layer process comprising physical layer processes, a second layer process comprising user plane control processes, and a third layer process comprising control plane control processes, the communication system comprising:
   a first base station for communicating with the user equipment over an air interface and comprising means for executing the first layer process; and
   allocating means for allocating the second layer process to a different network element than the third layer process;
   wherein the allocating means is arranged to reallocate the second layer process from a first network element to a second network element without relocating the third layer process in response to a handover of the first user equipment.

2. The cellular communication system of claim 1 wherein the allocating means is arranged to allocate at least one of the second layer process and the third layer process to a different network element than the first layer process.

3. The cellular communication system of claim 1 wherein the allocating means is arranged to reallocate the first layer process from the first base station to a second base station without relocating at least one of the second layer process and the third layer process in response to a handover of the user equipment from the first base station to the second base station.

4. The cellular communication system of claim 1 wherein the allocating means is arranged to allocate the third layer process and the first layer process to an initial serving base station for first user equipment upon call setup for the user equipment.

5. The cellular communication system of claim 1 wherein the allocating means is arranged to allocate at least one of the second layer process and the third layer process to a network element of a plurality of network elements in response to a computational loading of each of the plurality of network elements.

6. The cellular communication system of claim 1 wherein the allocation means is arranged to allocate at least one of the second layer process and the third layer process to a base station of the communication system.

7. The cellular communication system of claim 1 wherein the second layer process is arranged to support simultaneous physical layer processes in different base stations supporting a soft handover of the user equipment.

8. The cellular communication system of claim 1 furthermore comprising a core network arranged to address a network element executing the second layer process for user plane data for the communication and to address a network element executing the third layer process for control plane data for the communication.

9. A method of operation for a cellular communication system supporting at least a communication of a user equipment, the communication being supported by at least a first layer process comprising physical layer processes, a second layer process comprising user plane control processes, and a third layer process comprising control plane control processes, the method comprising:
   a first base station communicating with the first user equipment over the air interface by executing the first layer process; and
   allocating the second layer process to a different network element than the third layer process;
   wherein allocating comprises reallocating the second layer process from a first network element to a second network element without relocating the third layer process in response to a handover of the first user equipment.

* * * * *